United States Patent
Chang et al.

(10) Patent No.: US 8,098,693 B2
(45) Date of Patent: Jan. 17, 2012

(54) METHOD OF EARLY STARTING THE OPERATION OF A DESCRAMBLER

(75) Inventors: Tien-Hsin Chang, Hsinhua (TW); Shin-Shiuan Cheng, Hsinhua (TW)

(73) Assignee: Himax Technologies Limited, Tainan County (TW)

( * ) Notice: Subject to any disclaimer, the term of this patent is extended or adjusted under 35 U.S.C. 154(b) by 1111 days.

(21) Appl. No.: 11/416,136

(22) Filed: May 3, 2006

(65) Prior Publication Data

US 2007/0258488 A1    Nov. 8, 2007

(51) Int. Cl.
*H04J 3/06* (2006.01)

(52) U.S. Cl. ........ 370/509; 370/503; 370/510; 370/514; 370/515; 370/520; 375/365; 375/366; 375/368; 380/210; 380/268; 380/275; 380/276

(58) Field of Classification Search .......... 370/509–510, 370/514–515, 503, 520; 375/365–366, 368; 380/210, 268, 275, 276

See application file for complete search history.

(56) References Cited

U.S. PATENT DOCUMENTS

| | | | | |
|---|---|---|---|---|
| 5,784,462 A | * | 7/1998 | Tomida et al. | 380/270 |
| 6,154,468 A | * | 11/2000 | Lin et al. | 370/510 |
| 2002/0114301 A1 | * | 8/2002 | Yee et al. | 370/338 |
| 2006/0262873 A1 | * | 11/2006 | Johansson | 375/261 |

OTHER PUBLICATIONS

DVB Project Office, Introduction to DVB Systems, Apr. 15, 1999, DVB Project Office.*

* cited by examiner

*Primary Examiner* — Aung S Moe
*Assistant Examiner* — Hoon J Chung
(74) *Attorney, Agent, or Firm* — Stout, Uxa, Buyan & Mullins, LLP

(57) ABSTRACT

The present invention provides a method of early starting the operation of a descrambler. The method comprises the steps of receiving a, synchronous byte of a transport packet in a group of m packets, where m is an integer, generating an alignment index to indicate a location of the synchronous byte, delivering the alignment index to the descrambler, and loading an initialization sequence to the descrambler in accordance with the alignment index and starting an operation of the descrambler.

4 Claims, 6 Drawing Sheets

| Alignment Index | Initialization Sequence |
|---|---|
| 0 | 00a9 |
| 1 | 008c |
| 2 | 45ba |
| 3 | 3d85 |
| 4 | 540d |
| 5 | 5404 |
| 6 | 5c5a |
| 7 | 7a98 |

FIG. 5

METHOD OF EARLY STARTING THE OPERATION OF A DESCRAMBLER

BACKGROUND OF THE PRESENT INVENTION

1. Field of Invention

The present invention relates to the communication of digitally encoded data and in particular to a method of early starting the operation of a descrambler in which the data is scrambled in accordance with a binary sequence before transmission.

2. Description of Related Arts

In digital signal transmission pulse patterns can occur which have a disturbing DC component or whose energy component is particularly high at specific discrete frequencies. So as to avoid these pulse patterns, the digital signal which is to be transmitted is scrambled in a transmitter with a pseudo-random binary sequence (PRBS). In a receiver, descrambling is effected with the pseudo-random binary sequence (PRBS) which has previously been used in the transmitter. In other words, a scrambler in the transmitter and a descrambler in the receiver use the same pseudo-random binary sequence (PRBS).

FIG. 1 shows a typical scrambler/descrambler schematic diagram. Loading of an initialization sequence such as "100101010000000" into a pseudo-random binary sequence (PRBS) register 111, as indicated in FIG. 1, shall be initiated at the start of every predetermined transport packets such as eight transport packets.

In recent years, MPEG (Motion Picture Coding Experts Group) 2 standard has been widely employed to perform compression of video data such as in a broadcast system utilizing multi-channel digital signals and DVD. Two kinds of streams, i.e., a Transport Stream (TS) and a Program Stream (PS), are defined as a signal carrying a plurality of multiplexed contents such as video data and audio data. Particularly in digital broadcasting is used the transport stream. The transport stream is comprised of sequential packets each referred to as a transport packet.

Figures 2A, 2B:
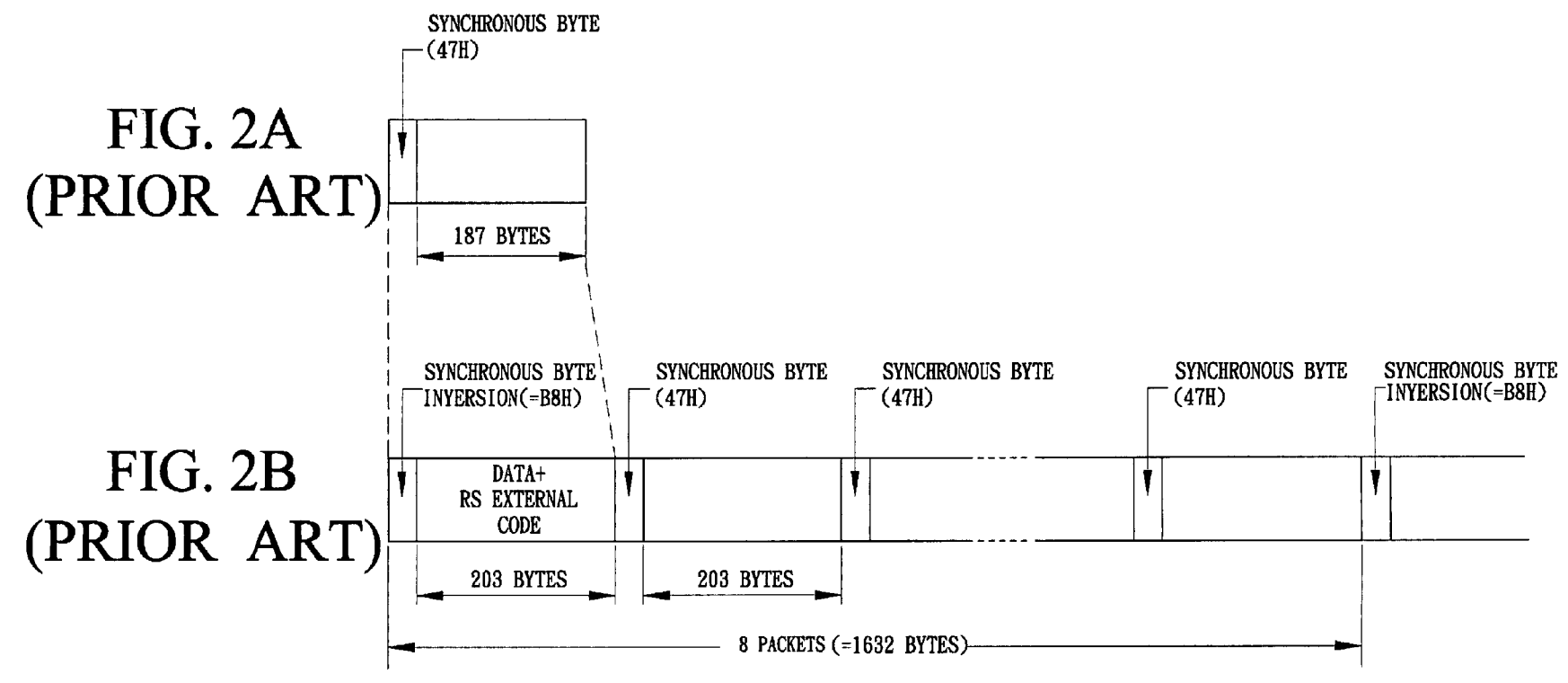

FIG. 2A illustrates a format of a MPEG (Motion Picture Coding Experts Group) 2 transport packet. The total packet length of the MPEG2 transport packet is 188 bytes. This includes one synchronous byte (i.e. $47_{HEX}$). To provide an initialization signal for the descrambler, the MPEG2 synchronous byte of the first transport packet in a group of predetermined packets such as eight packets shall be bitwise inverted from $47_{HEX}$ to $B8_{HEX}$. In other words, synchronization is established by inverting once the synchronous byte in every predetermined packets such as eight packets using the synchronous byte ($=47_{HEX}$) in the packet. To each MPEG2 transport packet (MPEG2 TS packet), an error correcting code of the Reed Solomon Code (204, 188) is added. Please refer to FIG. 2B which shows eight MPEG2 transport packets. The period of the PRBS shall therefore be 1632 bytes.

It has previously been proposed to scramble encoded video data prior to transmission by combining at an XOR gate the outputs of a coder and a PRBS (pseudo-random binary sequence) generator. The scrambled data can then be read only at a receiver having a matching descrambler. In order to descramble the data correctly it is necessary that the PRBS generator 110 in the receiver should be aligned with that in the transmitter so that corresponding bits in the pseudo-random sequence are applied to the same elements of data in the scrambler and descrambler. As described in the present applicant's earlier British applications numbers 8804552 and 8721603, this is achieved by searching for a video line synchronisation or frame alignment word, or other predetermined fixed component of the received data and aligning the PRBS generator accordingly. In other words, in order to let the data scrambling and data descrambling to work correctly, the operation of the scrambler and the descrambler have to be synchronized.

Assuming that the period of the PRBS is T such as eight transport packets, the pseudo-random binary sequence (PRBS) register of the scrambler will be reloaded again with a fixed initialization sequence such as "100101010000000" every eight transport packets. To provide an initialization signal for the scrambler, the MPEG2 synchronous byte of the first transport packet in a group of eight packets shall be bitwise inverted from $47_{HEX}$ to $B8_{HEX}$. In other words, the scrambler will be initialized with the fixed initialization sequence such as "100101010000000" every time at the start of $B8_{HEX}$. Similarly, the descrambler will load the pseudo-random binary sequence (PRBS) register thereof with the fixed initialization sequence such as "100101010000000" and start its operation by searching for $B8_{HEX}$. Please refer to FIG. 3A. If the receiver starts to toss out the valid data at time $t_0$, the descrambler will not start until time $t_1$. In other words, the worst-case latency time is T as indicated in FIG. 3B.

Accordingly, it would be advantageous to have an improved method of early starting the operation of a descrambler in which the data is scrambled in accordance with a binary sequence before transmission.

SUMMARY OF THE PRESENT INVENTION

A main object of the present invention is to provide a method of early starting the operation of a descrambler without latency time.

Another object of the present invention is to provide a method of early starting the operation of a descrambler utilizing a packet aligner to generate an alignment index to the descrambler such that the descrambler loads an initialization sequence in accordance with the alignment index and starting the operation of the descrambler.

Accordingly, in order to accomplish the above objects, the present invention provides a method of early starting the operation of a descrambler, comprising the steps of:

receiving a synchronous byte of a transport packet in a group of m packets, where m is an integer;

generating an alignment index to indicate a location of the synchronous byte;

delivering the alignment index to the descrambler; and loading an initialization sequence to the descrambler in accordance with the alignment index and starting an operation of the descrambler.

These and other objectives, features, and advantages of the present invention will become apparent from the following detailed description, the accompanying drawings, and the appended claims.

BRIEF DESCRIPTION OF THE DRAWINGS

FIG. 2A illustrates a typical format of a MPEG (Motion Picture Coding Experts Group) 2 transport packet.

FIG. 2B illustrates typical eight MPEG2 transport packets.

FIG. 5 shows a look-up table which stores different initialization sequences in accordance with the different alignment indexes according to the above preferred embodiment of the present invention.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Figure 1:
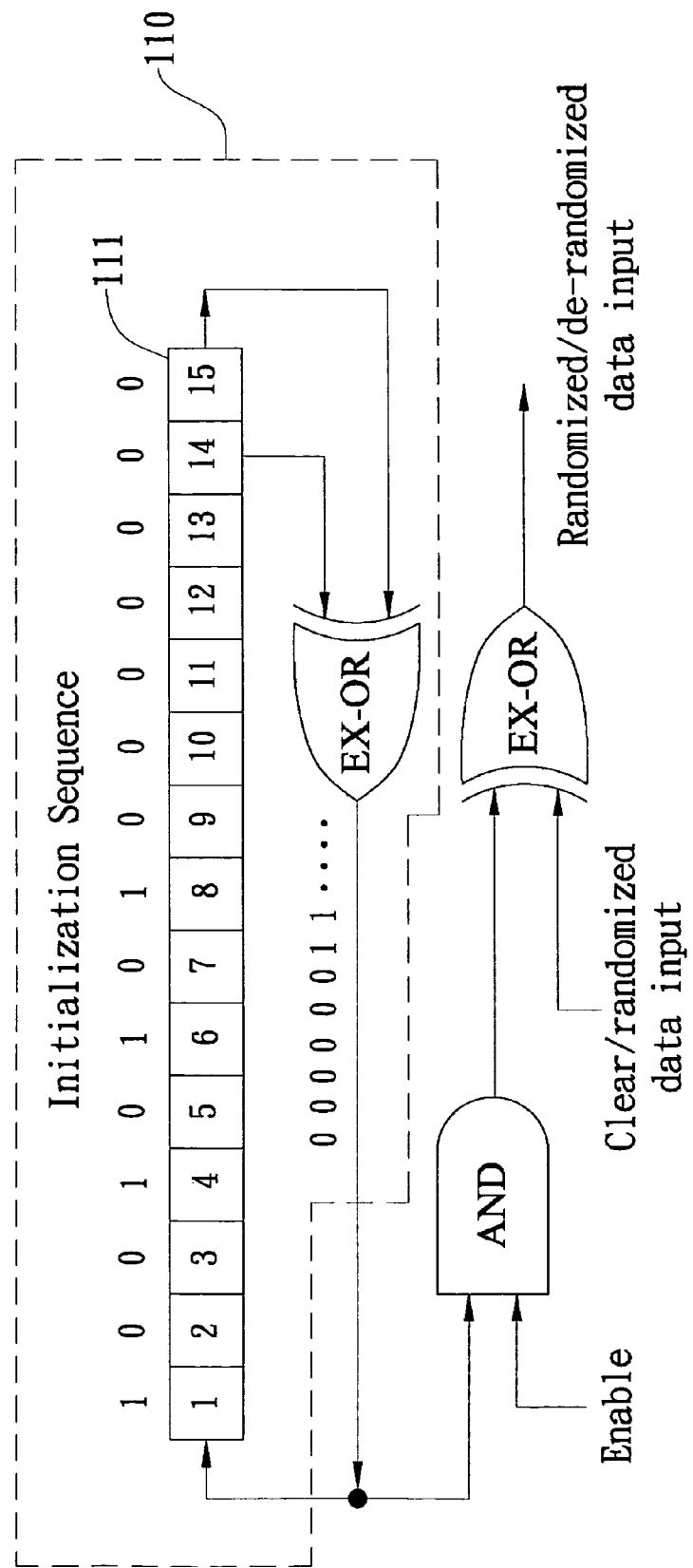
FIG. 1 shows a typical scrambler/descrambler schematic diagram.
Figure 3A:
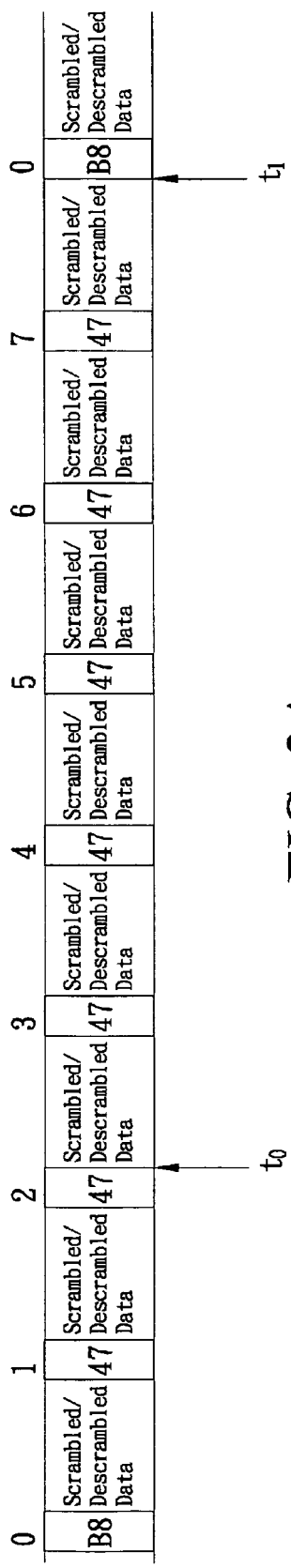
FIGS. 3A and 3B illustrate typical MPEG2 transport packets to start the operation of the descrambler.
Figure 3B:
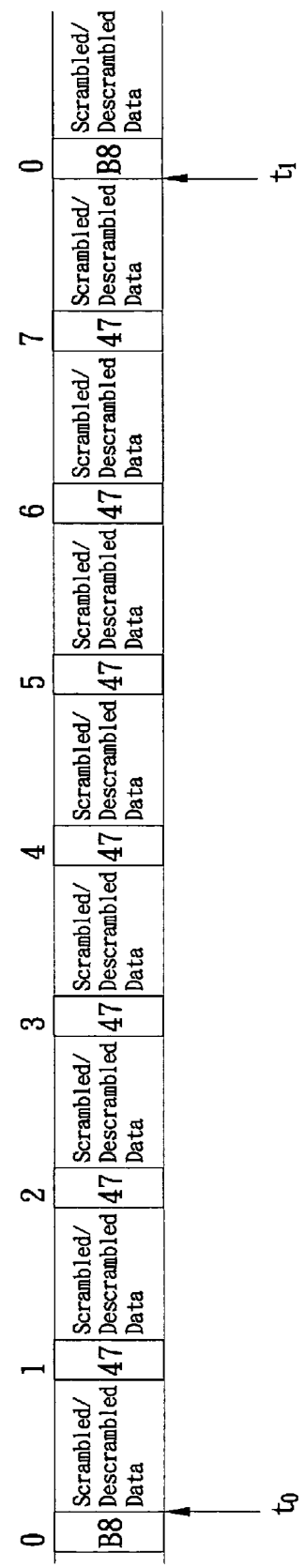
Figure 4:
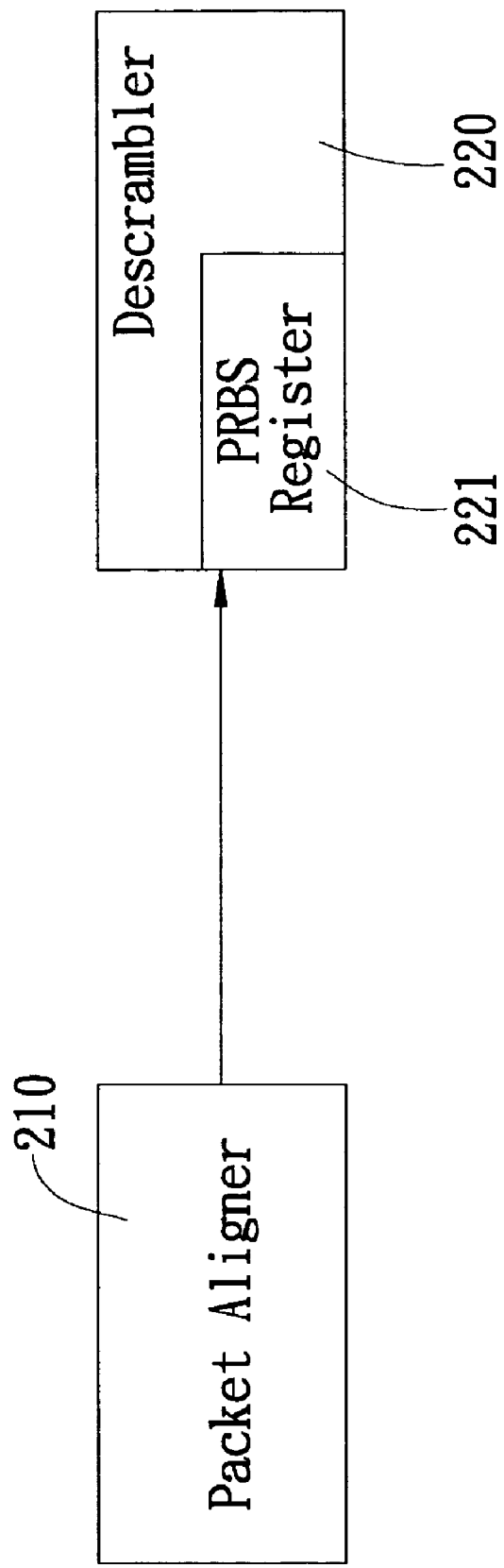
FIG. 4 illustrates a block diagram of an apparatus for early starting the operation of a descrambler according to the preferred embodiment of the present invention.

Referring to FIG. 4 of the drawings, which is a block diagram of an apparatus for early starting the operation of a descrambler according to the preferred embodiment of the present invention. As shown in FIG. 4, the present invention utilizes a packet aligner 210 to inform a descrambler 220 to start the operation of the descrambler. First, the packet aligner 210 receives synchronous bytes of transport packets in a group of m packets, where is an integer. Once the packet aligner 210 receives any one synchronous bytes of transport packets in a group of m packets, the packet aligner 210 will deliver an alignment index to the descrambler 220 to indicate the location of the synchronous byte. In other words, different alignment indexes indicates different synchronous bytes even though the synchronous bytes contains the same content.

Figure 6A:
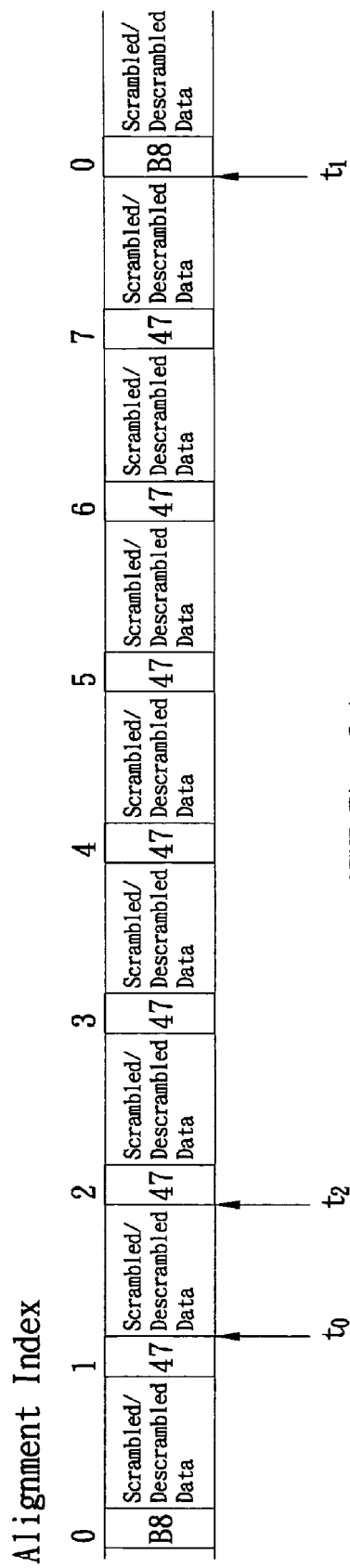
FIGS. 6A and 6B illustrate the MPEG2 transport packets to early start the operation of the descrambler according, to the above preferred embodiment of the present invention.
Figure 6B:
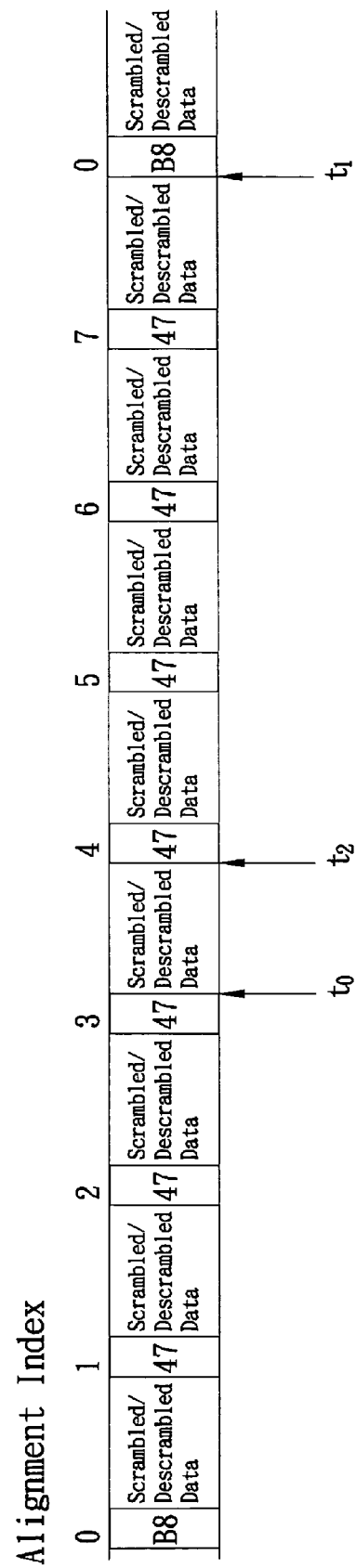

In this embodiment we use a group of eight packets as an example. Please refer to FIGS. 5~6. FIG. 5 shows a look-up table which stores different initialization sequences in accordance with the different alignment indexes according to the above preferred embodiment of the present invention. FIGS. 6A and 6B illustrate the MPEG2 transport packets to early start the operation of the descrambler according to the above preferred embodiment of the present invention. According to the look-up table as shown in FIG. 5 and the MPEG2 transport packets as shown in FIGS. 6A and 6B, the, alignment index of the synchronous byte $B8_{HEX}$ is 0, the alignment index of the first synchronous byte $47_{HEX}$ is 1, the alignment index of the second synchronous byte $47_{HEX}$ is 2, the alignment index of the third synchronous byte $47_{HEX}$ is 3, the alignment index of the fourth synchronous byte $47_{HEX}$ is 4, the alignment index, of the fifth synchronous byte $47_{HEX}$ is 5, the alignment index of the sixth synchronous byte $47_{HEX}$ is 6, and the alignment index of the seventh synchronous byte $47_{HEX}$ is 7. In other words, we could utilizes the different alignment indexes to indicate different synchronous bytes even though the synchronous bytes contain the same content such as $47_{HEX}$. Therefore, there exist different initialization sequence in corresponding to different alignment indexes.

As shown in FIGS. 4, 5, and 6A, if the receiver starts to toss out the valid data at time $t_0$, the pseudo-random binary sequence (PRBS) register 221 of the descrambler 220 could be loaded with an initialization sequence "010001011011110", i. e. 45ba when the packet aligner 210 receives the synchronous byte and delivers the alignment index, 02, to the descrambler 220. Therefore, the descrambler 220 could start at time $t_2$ but not until time $t_1$. In other words, in this invention the descrambler 220 need not to start its operation by searching for $B8_{HEX}$, however, it could load the pseudo-random binary sequence (PRBS) register 221 thereof with the corresponding initialization sequence based on the alignment index and start its operation.

Similarly, as shown in FIGS. 4, 5, and 6B, if the receiver starts to toss out the valid data at time $t_0$, the pseudo-random binary sequence (PRBS) register 221 of the descrambler 220 could be loaded with an initialization sequence "0101010000001101", i.e. 540d when the packet aligner 210 receives the synchronous byte and delivers the alignment index, 04, to the descrambler 220. Therefore, the descrambler could start at time $t_2$ but not until time $t_1$. In other words, in this invention the descrambler 220 need not to start its operation by searching for $B8_{HEX}$, however, it could load the pseudo-random binary sequence (PRBS) register 221 thereof with the corresponding initialization sequence based on the alignment index and start its operation.

From the forgoing descriptions, it can be shown that the present invention provides a method of early starting the operation of a descrambler without latency time. As described above, the present invention utilizes MPEG2 transport packets and a group of eight packets as examples but is also applicable to different forms of data.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for a packet aligner to early start a descrambling operation of a descrambler, comprising the steps of:
   receiving a synchronous byte of a transport packet in a group of m packets by said packet aligner, where m is an integer, wherein said synchronous byte of said transport packet in said group is inverted;
   generating one of a plurality of alignment indexes indicating another transport packet within said group by said packet aligner to indicate a location of another synchronous byte within said group, wherein said plurality of alignment indexes indicate a plurality of initialization sequences in a one-to-one mapping, and each alignment index corresponds to different synchronous byte within said group;
   delivering said alignment index generated from said packet aligner to said descrambler; and
   loading an initialization sequence that corresponds to said alignment index to said descrambler;
   wherein, once said descrambler receives said initialization sequence initiated by said alignment index generated, said descrambling operation of said descrambler is started.

2. The method, as recited in claim 1, wherein said loading of said initialization sequence step is to load said initialization sequence to a pseudo random binary sequence (PRBS) register in said descrambler.

3. The method, as recited in claim 2, wherein said initialization sequence that corresponds to said alignment index are from a look-up table.

4. The method, as recited in claim 1, wherein said initialization sequence that corresponds to said alignment index are from a look-up table.

* * * * *